(12) United States Patent
Brooks Powell et al.

(10) Patent No.: US 12,549,397 B2
(45) Date of Patent: Feb. 10, 2026

(54) MULTI-USER CAMERA SWITCH ICON DURING VIDEO CALL

(71) Applicant: International Business Machines Corporation, Armonk, NY (US)

(72) Inventors: Natalie Brooks Powell, Bolingbrook, IL (US); Hyman David Chantz, Scarsdale, NY (US); Sarbajit K. Rakshit, Kolkata (IN); Tami Rose Bryan, Howard, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/341,511

(22) Filed: Jun. 8, 2021

(65) Prior Publication Data
US 2022/0393896 A1 Dec. 8, 2022

(51) Int. Cl.
*H04L 12/18* (2006.01)
*G06F 3/04817* (2022.01)
*H04W 84/18* (2009.01)

(52) U.S. Cl.
CPC ...... *H04L 12/1818* (2013.01); *G06F 3/04817* (2013.01); *H04L 12/1822* (2013.01); *H04W 84/18* (2013.01)

(58) Field of Classification Search
CPC ............. H04L 12/1818; H04L 12/1822; G06F 3/04817; H04W 84/18
See application file for complete search history.

(56) References Cited

U.S. PATENT DOCUMENTS

| | | | | |
|---|---|---|---|---|
| 7,120,667 B2 * | 10/2006 | Derocher | ............ | H04L 12/1818 709/227 |
| 7,433,324 B2 * | 10/2008 | Switzer | ................... | G06F 9/451 370/347 |

(Continued)

FOREIGN PATENT DOCUMENTS

| | | | | |
|---|---|---|---|---|
| AU | 2016101343 A4 * | 9/2016 | | |
| CA | 2829597 A1 * | 9/2012 | ............. | G06F 16/58 |

(Continued)

OTHER PUBLICATIONS

"With Zoom Immersive View, you can arrange attendees in a single virtual meeting room", hitechglitz.com, Geoff Desreumaux, Apr. 26, 2021. pp. 1-3. (Year: 2021).*

(Continued)

*Primary Examiner* — Shourjo Dasgupta
(74) *Attorney, Agent, or Firm* — Daniel M. Yeates

(57) ABSTRACT

A computer-implemented method shares data feeds among devices. The method includes identifying a plurality of devices including a first device, where each device of the plurality of devices is within a vicinity of the first device. The method also includes forming an ad hoc network that includes each device of the plurality of devices. The method further includes determining a plurality of available data feeds, where each data feed is associated with one device of the plurality of devices. The method includes building a switch icon, where the switch icon includes a view of each available data feed, and the switch icon is configured to allow access to any feed of the plurality of feed and display a selected feed from the switch icon. The method includes sending the switch icon to each device in the ad hoc network.

20 Claims, 6 Drawing Sheets

(56) References Cited

U.S. PATENT DOCUMENTS

| | | | |
|---|---|---|---|
| 8,832,193 B1* | 9/2014 | Lindberg | H04L 67/10 |
| | | | 709/204 |
| 9,544,540 B2* | 1/2017 | Zhou | H04L 51/10 |
| 9,813,364 B2* | 11/2017 | Choi | H04W 4/024 |
| 10,091,599 B2* | 10/2018 | Lee | H04R 25/558 |
| 10,284,760 B2 | 5/2019 | Desai et al. | |
| 10,284,812 B1* | 5/2019 | Van Os | H04N 7/147 |
| 10,462,524 B2* | 10/2019 | Barnett | G06Q 30/00 |
| 2002/0101512 A1* | 8/2002 | Klapman | H04N 5/23219 |
| | | | 348/E7.083 |
| 2006/0031779 A1 | 2/2006 | Theurer et al. | |
| 2007/0263076 A1 | 11/2007 | Andrews et al. | |
| 2010/0030806 A1* | 2/2010 | Kuhlke | G06F 16/70 |
| | | | 707/732 |
| 2012/0089951 A1* | 4/2012 | Cassidy | G06F 3/0481 |
| | | | 715/854 |
| 2012/0290950 A1* | 11/2012 | Rapaport | H04L 67/306 |
| | | | 715/753 |
| 2013/0191458 A1* | 7/2013 | Krishnan | H04M 1/72457 |
| | | | 709/204 |
| 2013/0300821 A1 | 11/2013 | Lankford | |
| 2014/0066105 A1* | 3/2014 | Bridge | H04W 4/02 |
| | | | 455/457 |
| 2014/0181698 A1* | 6/2014 | Choi | H04L 51/222 |
| | | | 715/758 |
| 2014/0344294 A1* | 11/2014 | Skeen | G06F 16/639 |
| | | | 707/754 |
| 2014/0368601 A1* | 12/2014 | deCharms | H04L 67/26 |
| | | | 348/14.02 |
| 2015/0092744 A1 | 4/2015 | Singh | |
| 2015/0103135 A1 | 4/2015 | Zhou et al. | |
| 2015/0161663 A1 | 6/2015 | Klein | |
| 2015/0193137 A1* | 7/2015 | Schimon | G06F 3/0488 |
| | | | 715/833 |
| 2015/0245168 A1* | 8/2015 | Martin | H04W 4/029 |
| | | | 715/751 |
| 2015/0297949 A1* | 10/2015 | Aman | G06T 7/246 |
| | | | 348/157 |
| 2016/0150575 A1* | 5/2016 | Andersen | H04W 76/14 |
| | | | 370/329 |
| 2016/0164577 A1* | 6/2016 | Rexroad | H04B 5/06 |
| | | | 455/416 |
| 2016/0240009 A1* | 8/2016 | Lyren | G02B 27/0176 |
| 2016/0275167 A1 | 9/2016 | Scherpa | |
| 2016/0277802 A1* | 9/2016 | Bernstein | H04N 21/44213 |
| 2016/0295384 A1* | 10/2016 | Shan | H04W 4/02 |
| 2016/0381109 A1* | 12/2016 | Barnett | H04W 4/08 |
| | | | 709/231 |
| 2017/0063826 A1* | 3/2017 | Sundaresan | H04W 4/70 |
| 2017/0351402 A1* | 12/2017 | Yoakum | G06Q 10/00 |
| 2018/0184152 A1* | 6/2018 | Kirkpatrick | H04N 21/43637 |
| 2018/0227572 A1* | 8/2018 | King | H04N 21/21805 |
| 2019/0036991 A1* | 1/2019 | Hegde | H04L 67/04 |
| 2019/0114485 A1* | 4/2019 | Chan | G11B 27/031 |
| 2020/0260049 A1 | 8/2020 | Erna | |
| 2020/0296330 A1 | 9/2020 | Pandey et al. | |
| 2020/0359170 A1* | 11/2020 | Werner | H04B 17/318 |
| 2021/0037272 A1* | 2/2021 | Ghessassi | H04N 21/2146 |
| 2021/0142066 A1* | 5/2021 | Jayaram | H04N 21/2187 |
| 2021/0149553 A1* | 5/2021 | Lereya | H04L 51/046 |
| 2021/0337166 A1* | 10/2021 | John | G06Q 50/01 |
| 2021/0342044 A1* | 11/2021 | Xu | G06F 1/1677 |
| 2021/0397847 A1* | 12/2021 | Jayaram | H04N 21/44008 |
| 2022/0070504 A1* | 3/2022 | Hartnett | H04L 12/1827 |
| 2022/0084374 A1* | 3/2022 | Dour | G06F 3/165 |

FOREIGN PATENT DOCUMENTS

| | | | | |
|---|---|---|---|---|
| CA | 2773374 A1 * | 10/2012 | | H04L 63/107 |
| CN | 104272730 A * | 1/2015 | | H04N 21/00 |
| JP | 2016-010145 A | 1/2016 | | |
| JP | 2021-056191 A | 4/2021 | | |
| WO | WO-2020236073 A1 * | 11/2020 | | G06F 3/048 |
| WO | 2022257619 A1 | 12/2022 | | |

OTHER PUBLICATIONS

"Video chat is getting a much-needed redesign", David Pierce, protocol, Apr. 26, 2021, pp. 1-6. (Year: 2021).*

"Conference layouts and speaker names", Pexip Documentation, Nov. 4, 2015, pp. 1-20. (Year: 2015).*

"Using video in Microsoft Teams" Microsoft Support, Jun. 16, 2020, pp. 1-8. (Year: 2020).*

Larry Hardesty, "Explained: Ad hoc networks", published on Mar. 10, 2011 to https://news.mit.edu/2011/exp-ad-hoc-0310, retrieved May 26, 2023. (Year: 2011).*

Mark Burgess et al, "Scalability of Peer Configuration Management in Logically Ad Hoc Networks", published in 2004 Second Quarter to eTransactions on Network and Service Management, retrieved May 26, 2023. (Year: 2004).*

Ji Hu et al, "The Research of Low Power Wireless Sensor Network Architecture based on Fire Monitoring", published in 2008 11th IEEE International Conference on Communication Technology Proceedings, 2008, retrieved May 26, 2023. (Year: 2008).*

Juan Pablo Ospina Lopez et al., "Scalability in Ad Hoc Networks: The Effects of its Complex Nature", published in International Journal of Engineering and Technology, 2014, retrieved May 26, 2023. (Year: 2014).*

Shreyas Kulkarni et al, "Enabling a Decentralized Smart Grid using Autonomous Edge Control Devices", published in Internet of Things Journal, 2019, retrieved May 26, 2023. (Year: 2019).*

Ian F. Akyildiz et al, "A Survey on Wireless Mesh Networks", published in IEEE Radio Communications, Sep. 2005, retrieved May 26, 2023. (Year: 2005).*

Xiaoci Huang et al, "A Wireless Sensor Network-Based Approach with Decision Support for Monitoring Lake Water Quality", published in Sensors, 2015, retrieved May 26, 2023. (Year: 2015).*

Christian Henry et al, "A Survey on Temperature-Aware Routing Protocols in Wireless Body Sensor Networks", published in Sensors 2013, retrieved May 26, 2023. (Year: 2013).*

Mohammed Abdulhakim Al-Absi etc., "Moving Ad Hoc Networks—A Comparative Study", published May 31, 2021 in Sustainability 2021, 13, 6187, retrieved Nov. 20, 2023. (Year: 2021).*

SuiteApp.com, "Maps for NetSuite", published 2020 to https://www.suiteapp.com/Maps-for-NetSuite, retrieved Nov. 20, 2023. (Year: 2020).*

Hu Dujuan, "Mobile communication technology of sports events in 5G era", published Oct. 17, 20 to Microprocessors and Microsystems, retrieved Nov. 20, 2023. (Year: 2020).*

Fairfax County, "Traffic-Overview", published Apr. 25, 2018 to https://www.arcgis.com/home/item?id=58c54b66525a4f62a5a3c4d5ef1cb5e0, retrieved Nov. 20, 2023. (Year: 2018).*

Rajant, "Rajant Kinetic Mesh: Get Your Network Rajant Ready and Benefit from the 'Network of Things'", published Dec. 13, 2020 to https://rajant.com/wp-content/uploads/2020/12/BreadCrumb-Portfolio-Brochure.pdf,. retrieved Nov. 20, 2023. (Year: 2020).*

Seda Savasci Sen etc., "IoT-based GPS assisted surveillance system with inter-WBAN geographic routing for pandemic situations", published Mar. 9, 2021, retrieved Nov. 20, 2023. (Year: 2021).*

ScienceDirect, "Ad Hoc Wireless Network—an overview", published Dec. 1, 2018 to https://www.sciencedirect.com/topics/computer-science/ad-hoc-wireless-network, retrieved Nov. 20, 2023. (Year: 2018).*

Rajant, "Kinetic Mesh Wireless Solutions for Sports", published Sep. 17, 2020 to https://rajant.com/markets/action-sports, retrieved Nov. 20, 2023. (Year: 2020).*

ScienceDirect, "Wireless Mesh Network—an overview", published Dec. 1, 2018 to https://www.sciencedirect.com/topics/computer-science/wireless-mesh-network, retrieved Nov. 20, 2023. (Year: 2018).*

"Discover an Automated Camera Switching and Tracking System for Video Conferencing", Published Jun. 28, 2017, Prosound, 5

(56) References Cited

OTHER PUBLICATIONS pages. https://www.prosoundnetwork.com/gear-and-technology/discover-an-automated-camera-switching-and-tracking-system-for-video-conferencing.
"Introducing Voice Activated Camera Control System for Talk Shows & Video Podcasts using vMIx", YouTube, Jan. 13, 2016, 2 pages. https://www.youtube.com/watch?v=ZjX9RYiDXbM.
"Using the SlingStudio Console for iPad Auto-Switch feature", SlingStudio, printed Apr. 13, 2021, 6 pages. https://www.myslingstudio.com/help/kb/KB-1217.
Mell et al., "The NIST Definition of Cloud Computing", Recommendations of the National Institute of Standards and Technology, Special Publication 800-145, Sep. 2011, 7 pages.
International Searching Authority, Patent Cooperation Treaty PCT, Notification of Transmittal of The International Search Report and The Written Opinion of The International Searching Authority, or The Declaration, Date of mailing Jul. 20, 2022 (Jul. 20, 2022), International application No. PCT/CN2022/088488, International filing date Apr. 22, 2022(Apr. 22, 2022), 8 pages.
Japan Patent Office, "Notice of Reasons for Refusal" Jun. 17, 2025, 08 Pages, JP Application No. 2023-570349.

* cited by examiner

MULTI-USER CAMERA SWITCH ICON DURING VIDEO CALL

BACKGROUND

The present disclosure relates to data sharing, and, more specifically, multi-user camera switching in short range networks.

Generally, a view of an area is limited to one or two viewpoints of an observer (e.g., person, camera, etc.). An observer may obtain additional insights of the scene/object if viewed from additional viewpoints.

SUMMARY

Disclosed is a computer-implemented method to share data feeds among devices. The method includes identifying a plurality of devices including a first device, where each device of the plurality of devices is within a communicable vicinity of the first device. The method also includes forming an ad hoc network that includes each device of the plurality of devices. The method further includes determining a plurality of available data feeds, where each data feed is associated with one device of the plurality of devices. The method includes building a switch icon, where the switch icon includes a view of each available data feed, and the switch icon is configured to allow access to any feed of the plurality of feed and display a selected feed from the switch icon. The method further includes sending the switch icon to each device in the ad hoc network. Further aspects of the present disclosure are directed to systems and computer program products containing functionality consistent with the method described above.

The present Summary is not intended to illustrate each aspect, every implementation, and/or every embodiment of the present disclosure.

BRIEF DESCRIPTION OF THE DRAWINGS

Various embodiments are described herein with reference to different subject matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject matter, also any combination between features relating to different subject matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
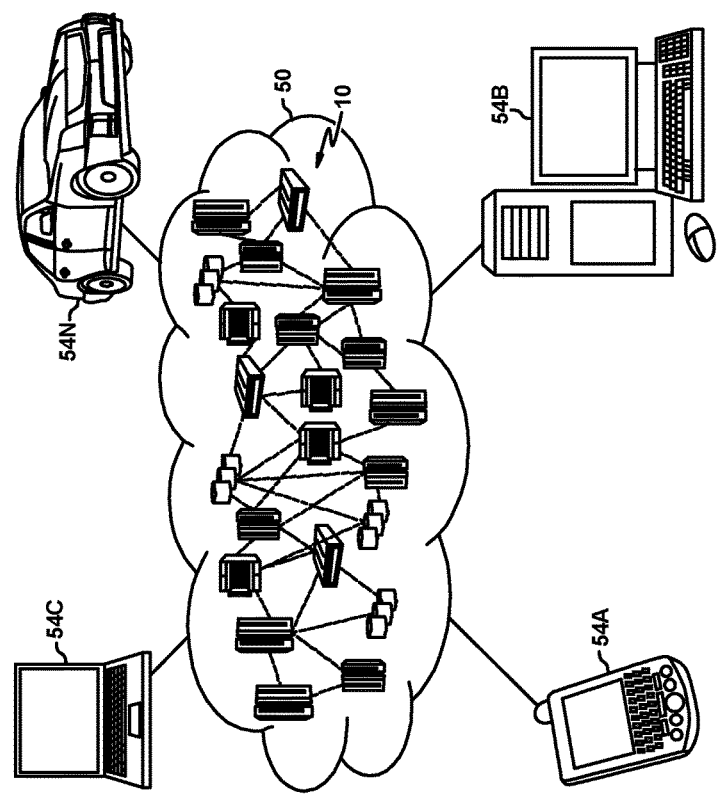
FIG. 1 depicts a cloud computing environment according to an embodiment of the present invention.

The present disclosure relates to data sharing, and, more specifically, multi-user camera switching in short range networks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
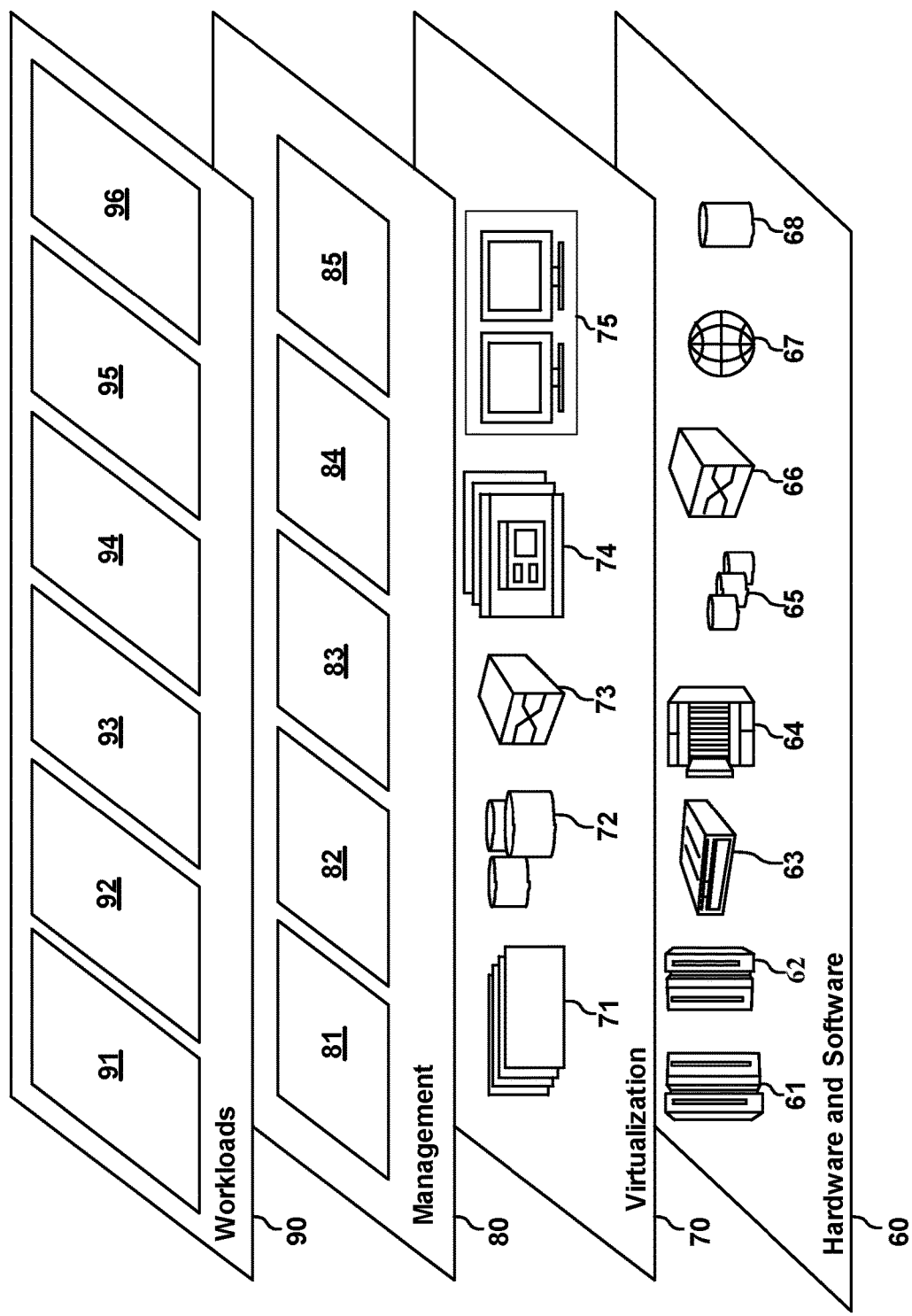
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selecting data feeds 96.

Data Processing System in General

Figure 3:
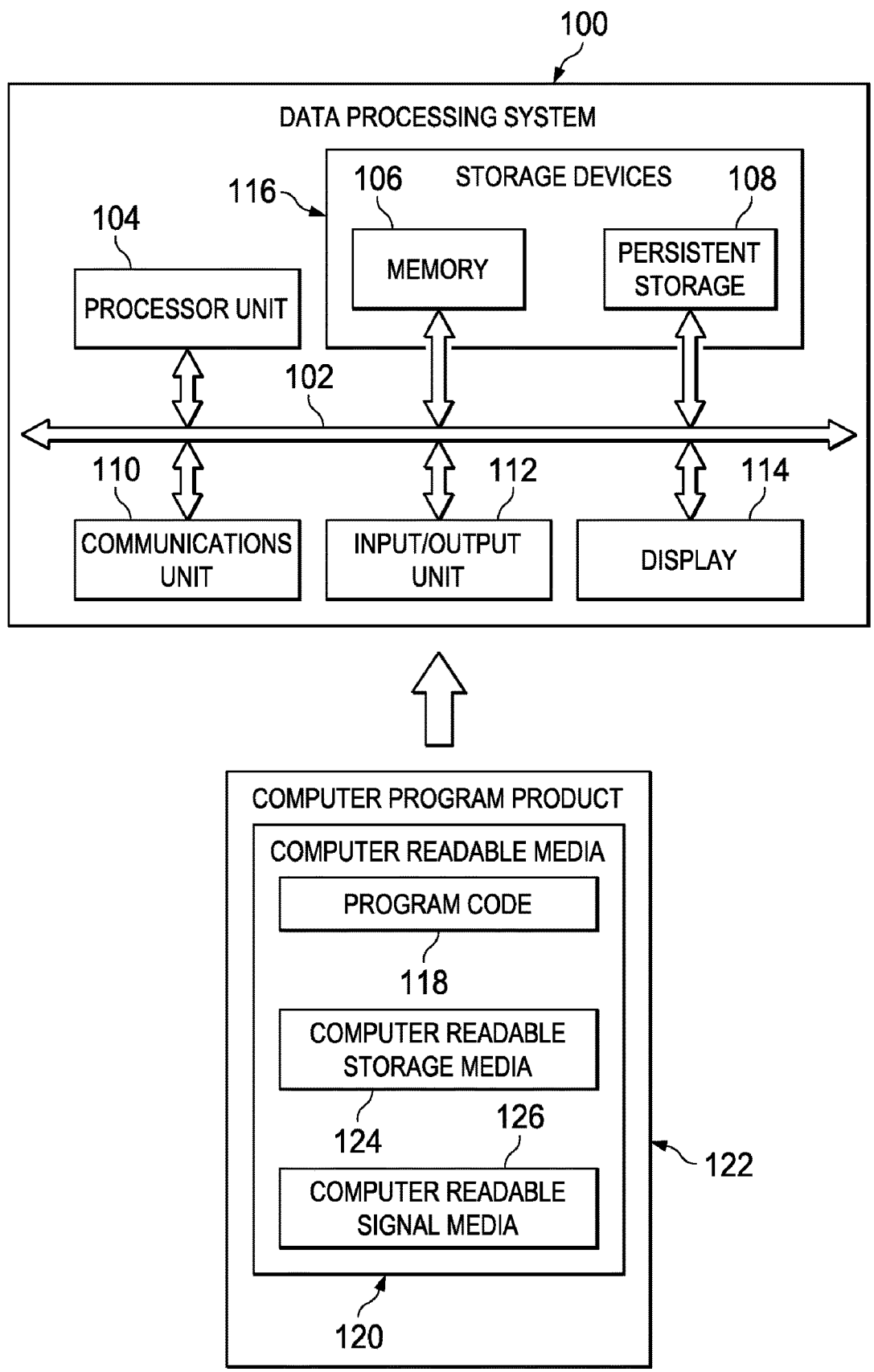
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Generally, a view of an area for a particular observer is limited to a single viewpoint (e.g., person, camera, etc.). An observer may obtain additional insights of the scene/object if viewed from additional viewpoints. In some scenarios, it can be impractical for a person to move to obtain all or at least more potential viewpoints. For example, an obstruction (e.g., crowds, fence, etc.) may prevent a user from moving to gain a desired vantage point. Additionally, it can be impractical or cost prohibitive to install cameras (or other sensors/viewing devices) at a scene. The impracticality can result from the scene/object being temporary and/or a lack of infrastructure.

Embodiments of the present disclosure include a method and system by which a user will have the flexibility to select and view any data feed (video, temperature sensor, etc.) from any device that is joined into an ad-hoc network. As an example, an event may occurring on a stage. A spectator watching on the on the left may have difficulty viewing what is happening on the right side of the stage and vice versa. Embodiments of the present disclosure will allow the spectators to form an ad-hoc mesh network with a device, and select a camera view from any of the connected devices. This allows the spectator on the left to select a video view from a spectator on the right and watch a video stream captured from the spectator on the right. Embodiments of the present disclosure can be deployed to provide benefit in a variety of fields, including education (e.g., classroom, fields trips, etc.), public safety (e.g., firefighting, search and rescue, etc.), sporting events, and social events (e.g., concerts, sightseeing, etc.), among others.

Embodiments of the present disclosure include a feed manager configured to allow switching between various data feeds from devices in a network. In some embodiments, the feed manager can identify other devices with which to form the network. In some embodiments, the feed manager forms the network. In some embodiments, the network is a mesh network. A mesh network can be a network where each node can connect directly to any other node in the network in a non-hierarchical fashion. In a mesh network, any device can be a host to and a client of any other device in the network. The network can be formed ad-hoc and/or by request. The ad-hoc network can be a network that is formed for and/or used for a limited purpose, such as to temporarily share data feeds between a group of mobile devices. The ad-hoc network can be created and closed by the feed manager. In some embodiments, the network can be based on the devices running/including a similar application. In some embodiments, each feed/device can opt-in and/or opt-out of sending/receiving any feed to/from the network. The opt-in/opt-out can occur at any time (e.g., after formation of network, while currently sharing a feed, etc.).

In some embodiments, the feed manager can identify a relative location of each device in the network. The location can be determined using known methods, for example, triangulation (e.g., cellular networks), sound profiles, GPS, and the like. In some embodiments, the feed manager can identify a subject of viewing. For example, if multiple cameras in the network are focused on a bonfire, then the system can identify the bonfire as the subject.

In some embodiments, the data manger can generate a camera switch icon. The camera switch icon can be a display that shows each available data feed (e.g., camera). A user can select, by an input, which data stream to view. In some embodiments, the switch icon can include relative positioning of the data feeds and/or a direction (if relevant) of any source of data.

In some embodiments, the feed manager can select a primary device. The primary device can be any device on the network. In some embodiments, the primary device is preselected (e.g., by the network initiator, etc.). In some embodiments, the primary device can manage the view of all other devices in the network. For example, in a classroom setting an instructor can be using the primary device and select any view for all of the students on the network. In some embodiments, each device can select any data feed from the network. For example, device A can be displaying a feed from device B's camera, device B can be displaying the feed from device C's camera, and so on. In some embodiments, the primary device is selected based on objective factors. For example, each device on the network can vote on which device is the primary device. As another example, the device sharing a feed with the most other network devices can be the primary device. In some embodiments, the primary device can change while the network is operating. In some embodiments, the primary device is selected based on a data input. For example, if each device included a thermometer, the primary device can be the device reading the highest (or lowest) temperature. Similarly, if each device included a microphone, the primary device can be the device reading the highest (or lowest) level of sound. In some embodiments, the feed manager can provide a preview of various feeds. The preview can be a snapshot of the data feed.

The aforementioned advantages are example advantages, and embodiments exist that can contain all, some, or none of the aforementioned advantages while remaining within the spirit and scope of the present disclosure.

Figure 4:
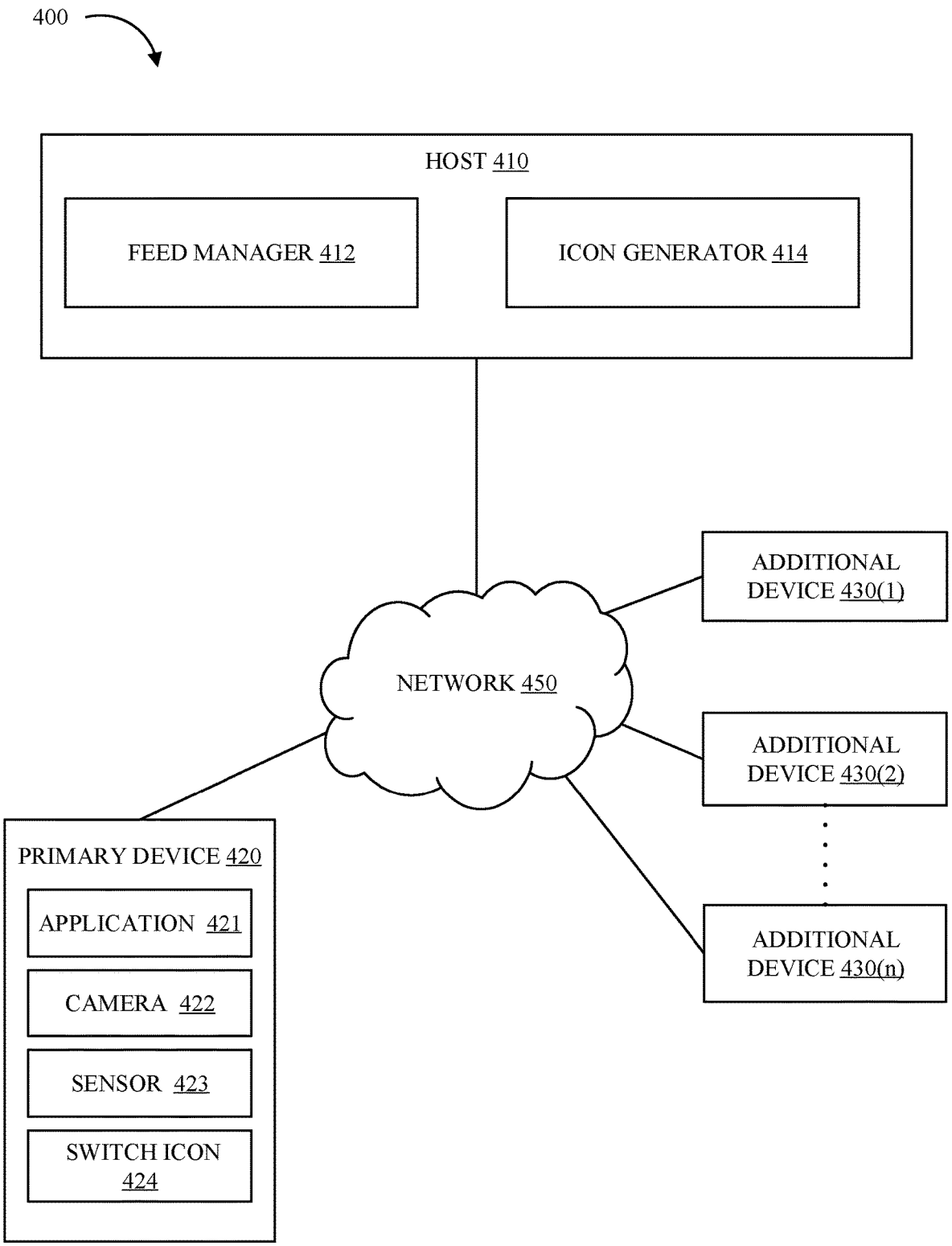
FIG. 4 illustrates a functional diagram of a computing environment suitable for operation of a feed manager in accordance with some embodiments of the present disclosure.

Referring now to various embodiments of the disclosure in more detail, FIG. 4 is a representation of a computing environment 400 that is capable of running a feed manager in accordance with one or more embodiments of the present disclosure. Many modifications to the depicted environment may be made by those skilled in the art without departing from the scope of the disclosure.

Computing environment 400 includes host 410, primary device 420, additional device 430(1), additional device 430(2), and up to additional device 430(n), and network 450, where n can be any positive whole number. Additional device 430(1) through additional device 430(n), can be referred to individually, severally, and/or collectively as additional device 430. In some embodiments, computing environment 400 can be included in a cloud computing environment (e.g., cloud computing environment 50).

Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between and among host 410, primary device 420, additional device 430, and other computing devices (not shown) within computing environment 400. In some embodiments, host 410, primary device 420, and/or additional device 430 may include a computer system, such as the data processing system 100 of FIG. 3.

In some embodiments, network 450 can be an ad-hoc and/or a mesh network. In various embodiments, network 450 uses one or more of cellular radio frequency, Bluetooth/Wi-Fi radio frequencies, audio, and/or light to communicate between the various devices on computing environment 400.

Host 410 can be a standalone computing device, a management server, a web server, a mobile computing device, or any other electronic device or computing system capable of receiving, sending, and processing data. In some embodiments, host 410 can represent a server computing system utilizing multiple computers as a server system, such as in a cloud computing environment (e.g., cloud computing environment 50). In some embodiments, host 410 includes feed manager 412 and icon generator 414. In some embodiments, host 410 can be combined with (or included in) one or more of primary device 420 and additional device 430.

Feed manager 412 can be any combination of hardware and/or software configured to allow selection of a data feed among devices in a network. Each data feed can be generated by and/or received from another device in the network. In some embodiments, feed manager 412 include icon generator 414, however they are shown as separate for discussion purposes.

In some embodiments, feed manager 412 can select a primary device. In some embodiments, feed manager 412 can designate/select primary device 420 as a primary device from devices in the network. In some embodiments, the primary device can control data flow to the other devices. In some embodiments, the primary device can select a feed to be sent to all/some of the other devices, while the secondary devices only receive the feed and cannot select. The primary device can be preconfigured. For example, the device that initiates the ad hoc network can be the primary device. In some embodiments, the primary device can be based on sensor data. for example, a device that is reading a highest temperature can be designated as the primary device.

In some embodiments, all devices have equal permissions. For example, each device can select a feed from any other device with no restrictions or limitations. This can be considered as though all devices are primary devices and/or that none of the devices are primary devices.

Icon generator 414 can be any combination of hardware and/or software configured to generate a feed switch icon (e.g., switch icon 424). In some embodiments, icon generator 414 can determine the number of devices that have joined the ad-hoc network. In some embodiments, icon generator 414 can receive from each device, in response to the devices joining the network, the number of cameras and/or sensors on the connected devices.

In some embodiments, icon generator 414 can obtain location data from each device in the network. The location data can include one or more of global positioning system (GPS) data, network data (e.g., triangulation using cellular networks), sound profiles, and other similar methods. In some embodiments, icon generator 414 can use the location data to determine each device's position relative to the other devices in the network.

In some embodiments, icon generator 414 can indicate which device is the primary device (if there is a primary device). In some embodiments, icon generator 414 can determine an object/focus of the ad hoc network. In some embodiments, the focus can be based on input received by the primary device. For example, if the primary device is controlled by a fire crew chief, the inputs received by the device operated by a fire crew chief can lead to the focus point (or focus area, or focus object). For example, if the chief is switching between two feeds that are focused on the same location (or spends a majority of time looking at the location), then icon generator 414 can determine, based on those inputs, the focus area. The inputs can include the number of devices that are selecting a particular data stream, a combination of directional views (e.g., when two devices are facing each other a distance apart, the focus area can be between the two devices), time spent on feeds, relative locations, voice inputs (e.g., recognizing an input of gathering attention combined with a direction), and other similar inputs. Icon generator 414 can use image processing to determine if several devices are directed toward a common object.

In some embodiments, icon generator 414 can indicate the relative location of the focus object in the display. The overall icon can include one or more of, each device in the network, each data feed in the network, relative location of each feed/device, primary device, and/or the focus object.

Primary device 420 can be any computing device, electronic device, or computing system capable of receiving, sending, and processing data. In some embodiments, primary device 420 is a smart device, such as a smart phone, a smart watch, smart glasses, and/or another similar device. In some embodiments, primary device 420 is configured to join an ad hoc network with other computing devices. In some embodiments, primary device 420 can send a selected feed to all/some connected devices.

In some embodiments, primary device 420 includes application 421, camera 422, sensor 423, and switch icon 424.

Application 421 can be any combination of hardware and/or software configured to carry out a function on a computing device (e.g., primary device 420). In some embodiments, application 421 is a web application. In some embodiments, application 421 can represent any number of separate applications. In some embodiments, application 421 can be operating within a cloud computing environment. In some embodiments, application 421 can instigate formation of the ad hoc network. In some embodiments, application 421 generates a data feed. The data feed can be based on one or more sensors on the primary device 420. For example, the feed can be a video feed from a camera and/or a temperature feed from a thermometer/infrared detector.

Camera 422 can be any combination of hardware and/or software configured to capture image data from primary device 420. In some embodiments, primary device 420 includes two or more separate cameras. Each camera can be pointed in a different direction (e.g., opposite sides of a device). In some embodiments, camera 422 can capture video stream as well as a still shot.

Sensor 423 can be any sensor attached to primary device 420 configured to gather data. There can be any number of sensors on the device. In some embodiments, sensor 423 can be any sensor that does not include camera 422 (as a camera can be as sensor). Sensor 423 can include one or more of microphone, thermometer, infrared sensor, hear sensor, barometer, gyroscope, compass, accelerometer and the like. In some embodiments, the data captured by camera 422 and one or more sensor 423 can be combined to create a single data stream. For example, camera 422 can capture video and microphone sound, and the two can be combined as a video stream with sound.

Switch icon 424 can be integrated with the display on primary device 420. In some embodiments, switch icon 424 allows functionality for selecting a data feed. In some embodiments, switch icon 424 can show each feed available for selection. The display can be a list display. The list can show an identifier for the device. The identifier can be automatically generated and/or input by a device user. In some embodiments, a device may have more than one available feed (e.g., 2 cameras). Switch icon 424 can show the available feed as separate options.

Figure 5:
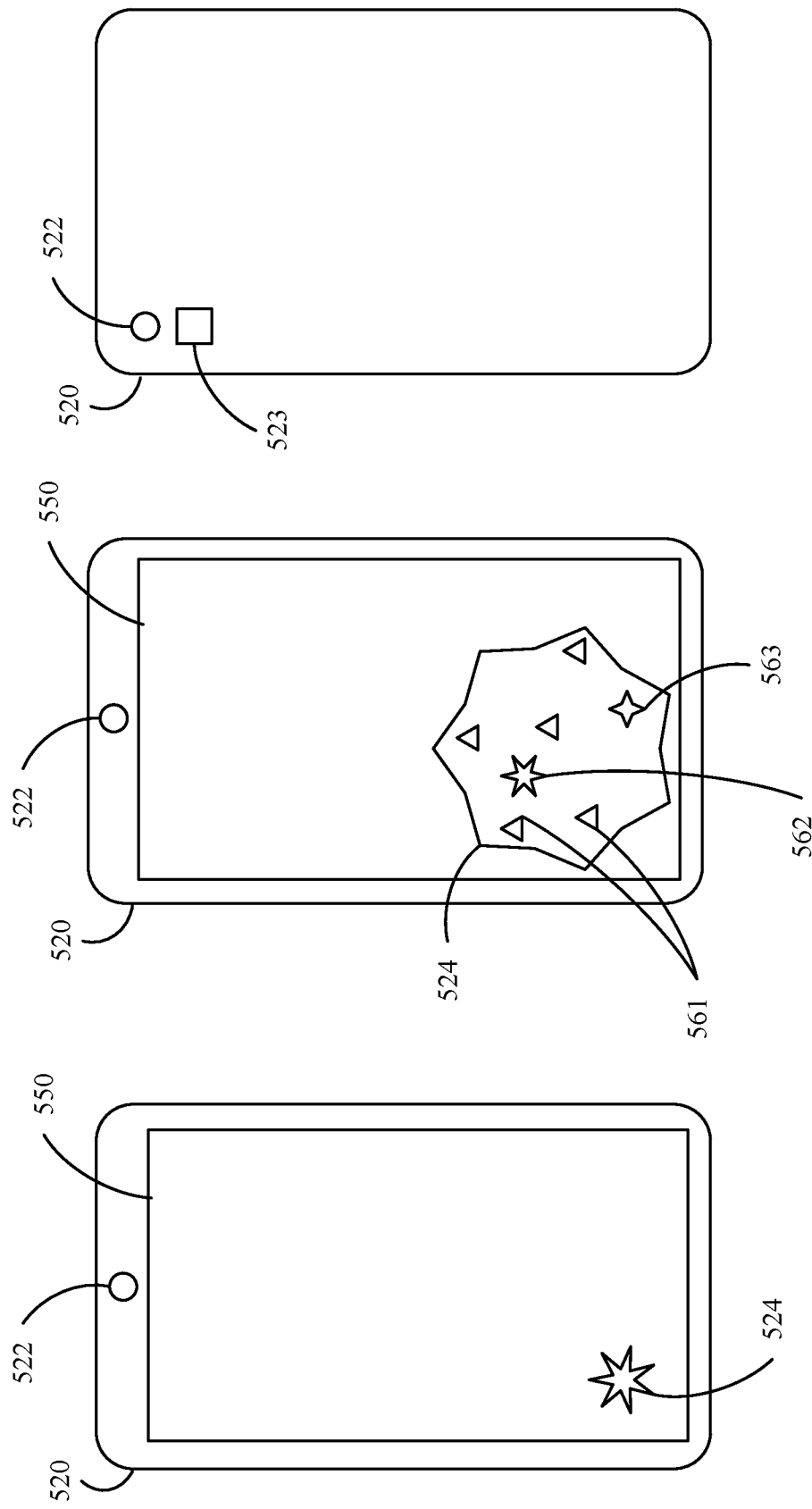
FIG. 5A illustrates a front view of a network device with a collapsed switch icon in accordance with some embodiments of the present disclosure.
FIG. 5B illustrates a front view of a network device with an expanded switch icon in accordance with some embodiments of the present disclosure.
FIG. 5C illustrates a back view of a network device in accordance with some embodiments of the present disclosure.

In some embodiments, switch icon 424 can show a relative position of each device (or feed, or source of feed). In some embodiments, switch icon 424 can uniquely indicate primary device 420 and/or relative location of a subject of the feed. This is discussed further in relation to FIG. 5.

Additional device 430 can be any computing device, electronic device, or computing system capable of receiving, sending, and processing data. In some embodiments, additional device 430 can be combined with components of host 410. Each or any additional device 430 can include any or all of the components within host 410. In some embodiments, each additional device can have functionality and subcomponents of primary device 420 (e.g., application 421, camera 422, etc.).

In some embodiments, "primary device" and "additional device" are designations of the network and permanently assigned to a particular device. In some embodiments, the device that is considered the primary device can be dynamically changed. As a scenario changes, the device considered the primary device change from first device in the network to a second device. In addition, switch icon 424 can be updated based on the change on each device in the network.

FIGS. 5A-5C depict one embodiment of a computing device 520. The device can be any one of host 410, primary device 420, and/or additional device 430. Switch icon 524 is depicted in the bottom portion of display area 550.

FIG. 5A displays a front portion of device 520. The embodiment shown is similar one example of a smart phone. Device 520 includes display area 550. On the top of device 520 is camera 522, which can be consistent with camera 422. Switch icon 524 is shown on display 550, which can be consistent with switch icon 424. FIG. 5A shows switch icon 524 in a collapsed state. Switch icon 524 can be expanded and collapsed in response to receiving an input to the device.

FIG. 5B depicts the same device as FIG. 5A (i.e., device 520) with switch icon 524 expanded. Device 520 includes camera 522, display area 550, and expanded switch icon 524. Within the expanded switch icon 524, subject device 563, additional devices indicators 561, and subject/object of the feeds at 562 are each depicted. Each type/class of device/object can have a unique identifier. The identifier can be shapes, colors, names, and/or any other manner of indicating available feeds. The location within switch icon 524 can be a relative position as determined by an icon generator (such as, for example, icon generator 414). As devices move around, switch icon 524 can be dynamically updated based on changes in location/feed data. In some embodiments, each indication in switch icon 524 can include a direction indicator (not shown). The direction indicator can show a direction from which the data is obtained, and/or a direction the sensor is pointing. For example, if each device includes a camera, an arrow indicating a direction the camera is pointing can be included with each additional device indicators 561.

In some embodiments, an object of feed 552 can be determined. The determination can be based on analysis of each of the feeds. For example, if several of the video feed can include flames, then the object can be identified as a bonfire. The focus object can be determined using image recognition and/or compass and location data to determine a direction, and relative location of an object. This can allow a user of subject device 563 to see that other views of object 562 are available from different vantage points.

FIG. 5C depicts the back side of the device 520, including camera 522 and sensor 523. Camera 522 can be a second camera on the device. Sensor 523 can be consistent with sensor 423. In some embodiments, embodiments, additional sensors and/or cameras can be located at any position on the front and/or the back of device 520.

Figure 6:
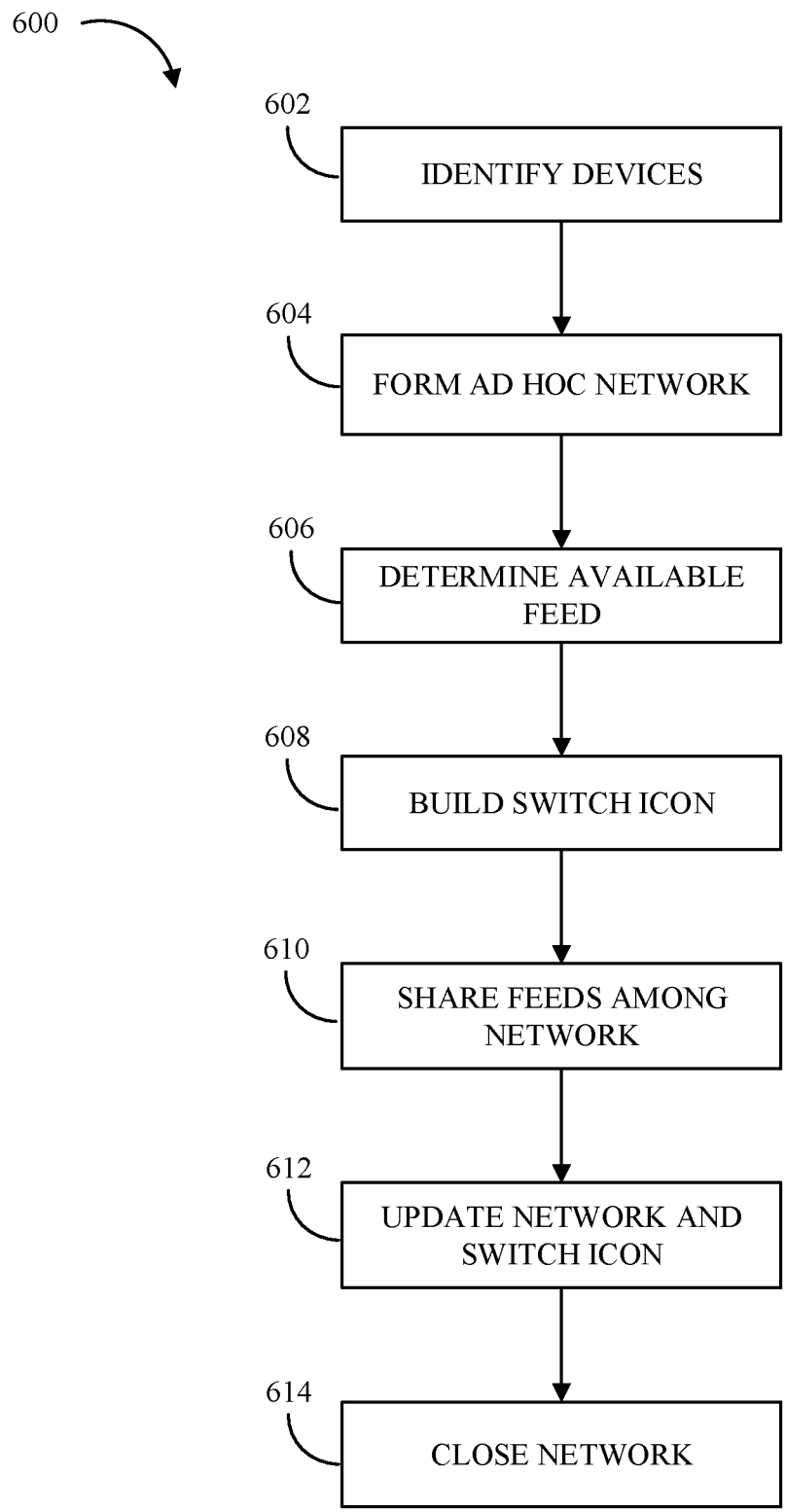
FIG. 6 illustrates a flow chart of an example method to allow for multi-user camera switching, in accordance with some embodiments of the present disclosure.

FIG. 6 depicts a flowchart of an example method, method 600, for selecting a data feed from an ad hoc network that can be performed in a computing environment (e.g., computing environment 400 and/or cloud computing environment 50). One or more of the advantages and improvements described above for selecting a data stream from an ad hoc network may be realized by method 600, consistent with various embodiments of the present disclosure.

Method 600 can be implemented by one or more processors, host 410, primary device 420, secondary device 430, their subcomponents, and/or a different combination of hardware and/or software. In various embodiments, the various operations of method 600 are performed by one or more of host 410, feed manager 412, icon generator 414, primary device 420, application 421, camera 422, sensor 423, switch icon 424, or additional device 430. For illustrative purposes, the method 600 will be described as being performed by feed manager 412.

At operation 602, feed manager 412 identifies one or more devices. In some embodiments, feed manager 412 can be included in a first device. In some embodiments, the identification can be based on an application. The application on the device can be configured to notify other devices are available in a vicinity (or communicable vicinity). The notification can include notifying the other devices that the device can/may form an ad hoc network and/or notifying the device additional devices are in the vicinity. The vicinity can be based on a location, a predefined event (e.g., a concert, sporting event, class, etc.), a distance (e.g., distance between devices, limitation on network capabilities, and the like. In some embodiments, the application can send a request to all devices within the range. Each device can respond to a request based on receiving an input from a user and/or based on predetermined configuration of the application.

At operation 604, feed manager 412 forms an ad-hoc network. In some embodiments, each identified device joins the network as a node. In some embodiments, the ad hoc network is a mesh network. At operation 606, feed manager 412 determines available data feeds. In some embodiments, the available data feeds are sent to feed manager 412 in response to forming the ad hoc network. Each device can send all available feeds. In some embodiments, each device can add and/or remove data feeds from the network. For example, if a device has two cameras and another sensor, the device can allow access to one of the cameras. In this scenario, the second camera and the sensor are not available feeds.

At operation 608, feed manager 412 generates/creates/builds the switch icon (e.g., switch icon 424). In some embodiments, the switch icon is created by icon generator 414. In some embodiments, generating the switch icon includes determining a location of each device, relative to one or more other devices/feeds in the network. In some embodiments, operation 608 includes sending the switch icon to each device in the network.

At operation 610, feed manager 412 shares all data feeds to each device. In some embodiments, the feed sharing is based on an input to each device. The input can indicate which feed to display on any particular device.

At operation 612, feed manager 412 updates the network and switch icon. In some embodiments, devices may enter and/or exit the proximity of the mesh network. In some embodiments, new devices can be dynamically added and/or removed from the ad hoc network. In some embodiments, operation 612 includes reperforming one or more of operations 602 through 608 for each device that enters and/or exits the proximity and/or the network. In some embodiments, one or more of operations 602 through 610 are reperformed based on movement of one or more devices and/or the focus object.

In some embodiments, operation 612 and/or operation 608 includes identifying a focus object. The determination can be based on analyzing the feeds. For example, image recognition processes can be used to determine if all/most of the cameras are pointed at a common object. Direction of the feed (e.g., direction the camera is pointing), time feeds are viewed, and other similar factors can be included in the object determination. In some embodiments, there is not object determination. In some embodiments, the focus object can change. The switch icon can be dynamically updated in response to identifying a new focus object, and/or a moving focus object. In some embodiments, a focus object may cease to be the focus object. The switch icon can be dynamically updated based on change/removal of the focus object.

In some embodiments, operation 612 and/or operation 608 includes determining a primary device. In some embodiments, the primary device can select a particular feed to be viewed by a particular device. In some embodiments, the primary device is predetermined and/or designated by application settings. In some embodiments, the primary device is chosen based on inputs from all network devices. For example, each available feed can have a vote for primary device. The device with the most votes is designated as the primary. In some embodiments, the primary device can be based on a predetermined input. For example, the device that has observed the highest temperature from a heat sensor (e.g., thermometer, infrared camera, etc.) can be designated as the primary device. The device designated as the primary device can be dynamically changed. For example, if the primary device is based on temperature, when a second device's temperature reading exceeds the first device's temperature reading, the second device can be designated as the primary device.

At operation 614, feed manager 412 closes/ends the ad hoc network. In some embodiments, the network is closed based on it being open for a period of time. In some embodiments, the network is closed based on an amount of feeds being shared. For example, if no device is viewing the feed of another device then the network can close. In some embodiments, the network can be closed in response to devices leaving a proximity of the other devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying, by a first device, a plurality of devices including the first device, wherein each device of the plurality of devices is within a communicable vicinity of the first device;
    forming an ad hoc network that includes each device of the plurality of devices;
    determining, by the first device, a plurality of available data feeds, wherein each available data feed is associated with a respective device of the plurality of devices, including a first data feed by the first device;
    generating, by the first device and in response to forming the network and identifying the plurality of devices, a switch icon, wherein the switch icon includes an expanded view, wherein the expanded view is configured to display a location of each device in the ad-hoc network relative to each other device associated with each available feed including all available data feeds of the plurality of available data feeds, and the switch icon is configured to allow access to any feed of the plurality of feeds and display a selected feed from the switch icon;
    identifying a common subject of the plurality of available data feeds;
    updating, by the first device, the switch icon to indicate a relative location of each of the data feeds with respect to the identified common subject; and
    sending, by the first device and through the ad hoc network, the switch icon to each device in the ad hoc network.

2. The method of claim 1, further comprising:
    selecting from the switch icon, on the first device of the plurality of devices, a second data feed associated with a second device of the plurality of devices; and
    displaying the second data feed on the first device.

3. The method of claim 2, further comprising:
    displaying the switch icon on each device of the plurality of devices; and
    displaying, in response to selecting a third data feed on the second device, the third data feed on the second device.

4. The method of claim 1, wherein the ad hoc network is a mesh network.

5. The method of claim 1, wherein each device of the plurality of devices in the ad-hoc network provides at least one of the plurality of available data feeds.

6. The method of claim 5, wherein each device of the plurality of devices includes an additional data feed from a heat sensor on an outside of each device.

7. The method of claim 1, further comprising:
    identifying a new device in the communicable vicinity of the first device;
    adding the new device to the ad hoc network; and
    updating, based on a new data feed, the switch icon.

8. The method of claim 1,
    wherein the first device is a primary device, the primary device is configured to select a data feed from the switch icon to be displayed on each device; and
    the method further comprising:
    updating the switch icon to indicate the first device is the primary device.

9. The method of claim 8, wherein the designation of the first device as the primary device is based on a highest observed temperature from a heat sensor, wherein the heat sensor is a thermometer on the outside of the device.

10. The method of claim 1, wherein the expanded view includes a direction indicator for each data feed indicating a feed direction from which each available data feed is obtained.

11. The method of claim 1, wherein the common subject is an object.

12. A system comprising:
    a processor; and
    a computer-readable storage medium communicatively coupled to the processor and storing program instructions which, when executed by the processor, are configured to cause the processor to:
    identify, by a first device, a plurality of devices including the first device, wherein each device of the plurality of devices is within a communicable vicinity of the first device;
    form an ad hoc network that includes each device of the plurality of devices;
    determine, by a first device, a plurality of available data feeds, wherein each available data feed is associated with a respective device of the plurality of devices;
    generate, by the first device and in response to forming the network and identifying the plurality of devices, a switch icon, wherein the switch icon includes an expanded view, wherein the expanded view is configured to display a location of each device in the ad-hoc network relative to each other device associated with each available feed including all available data feeds of the plurality of available data feeds, and the switch icon is configured to allow access to any feed of the plurality of feed and display a selected feed from the switch icon;
    identify a common subject of the plurality of available data feeds;
    update, by a first device, the switch icon to indicate a relative location of each of the data feeds with respect to the identified common subject; and
    send, by the first device and through the ad hoc network, the switch icon to each device in the ad hoc network.

13. The system of claim 12, wherein the program instructions are further configured to cause the processor to:
    select from the switch icon, on the first device of the plurality of devices, a second data feed associated with a second device of the plurality of devices; and
    display the second data feed on the first device.

14. The system of claim 13, wherein the program instructions are further configured to cause the processor to:
- display the switch icon on each device of the plurality of devices; and
- display, in response to selecting a third data feed on the second device, the third data feed on the second device.

15. The system of claim 12, wherein the ad hoc network is a mesh network.

16. The system of claim 12, wherein each device of the plurality of devices in the ad-hoc network provides at least one of the plurality of available data feeds which includes a video data feed generated from a camera and a microphone.

17. A computer program product, the computer program product comprising a computer readable storage medium having program instructions embodied therewith, the program instructions executable by a processing unit to cause the processing unit to:
- identify a plurality of devices including a first device, wherein each device of the plurality of devices is within a communicable vicinity of the first device;
- form an ad hoc network that includes each device of the plurality of devices;
- determine a plurality of available data feeds, wherein each available data feed is associated with a respective device of the plurality of devices and each device of the plurality of devices includes an additional data feed from a thermometer to measure the temperature around each device;
- generate a switch icon, wherein the switch icon includes an expanded view, wherein the expanded view is configured to display a location of each device in the ad-hoc network relative to each other device associated with each available feed, and the switch icon is configured to allow, for each device, access to any feed of the plurality of feeds to all devices in the ad hoc network;
- identify a common subject of the plurality of available data feeds;
- update the switch icon to indicate a relative location of each of the data feeds with respect to the identified common subject;
- send the switch icon to each device in the ad hoc network; and
- designate the first device as a primary device, wherein the primary device is configured to select a data feed from the switch icon to be displayed on each device, wherein the designation of the first device as the primary device is based on a highest observed temperature from a heat sensor, on the outside of the first device; and
- update the switch icon to indicate the first device is the primary device.

18. The computer program product of claim 17, wherein the program instructions are further configured to cause the processing unit to:
- select from the switch icon, on the first device of the plurality of devices, a second data feed associated with a second device of the plurality of devices; and
- display the second data feed on the first device.

19. The computer program product of claim 18, wherein the program instructions are further configured to cause the processing unit to:
- display the switch icon on each device of the plurality of devices; and
- display, in response to selecting a third data feed on the second device, the third data feed on the second device.

20. The computer program product of claim 17, wherein each device of the plurality of devices includes a video data feed generated from a camera and a microphone.

* * * * *